US007313762B2

United States Patent
Bozdagi et al.

(10) Patent No.: US 7,313,762 B2
(45) Date of Patent: Dec. 25, 2007

(54) METHODS AND SYSTEMS FOR REAL-TIME STORYBOARDING WITH A WEB PAGE AND GRAPHICAL USER INTERFACE FOR AUTOMATIC VIDEO PARSING AND BROWSING

(75) Inventors: Gozde Bozdagi, Yenisehir (TR); Hong Heather Yu, Plainsboro, NJ (US); Michael R. Campanelli, Webster, NY (US); Robert Bryll, Chicago, IL (US); Steven J. Harrington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 881 days.

(21) Appl. No.: 10/624,762

(22) Filed: Jul. 22, 2003

(65) Prior Publication Data
US 2004/0054964 A1    Mar. 18, 2004

Related U.S. Application Data

(62) Division of application No. 09/271,867, filed on Mar. 18, 1999, now Pat. No. 6,647,535.

(51) Int. Cl.
*G06F 3/00* (2006.01)
(52) U.S. Cl. .................................... 715/719
(58) Field of Classification Search ............... 715/719, 715/721, 723, 720
See application file for complete search history.

(56) References Cited

U.S. PATENT DOCUMENTS 5,956,026 A * 9/1999 Ratakonda ................. 715/723
6,222,532 B1 * 4/2001 Ceccarelli .................. 715/723
6,252,975 B1   6/2001 Bozdagi et al.
6,463,444 B1 * 10/2002 Jain et al. ................ 707/104.1
6,487,360 B1 * 11/2002 Sumiyoshi et al. ........... 386/52
6,493,042 B1   12/2002 Bozdagi et al.
6,526,215 B2 * 2/2003 Hirai et al. .................... 386/52
6,577,807 B1 * 6/2003 Yaegashi et al. ............ 386/52

OTHER PUBLICATIONS

H. Yu et al., "Feature-Based Hierarchical Video Segmentation," Princeton University, Electrical Engineering. Department, 1996.
H. Zhang et al., "Content-Based Video Browsing Tools," *SPIE*, vol. 2417, Feb. 1995, pp. 389-398.

(Continued)

*Primary Examiner*—Sy D. Luu
*Assistant Examiner*—Thanh Vu (57) ABSTRACT

Systems and methods to enable real-time and near real-time storyboarding on the World Wide Web in addition to a graphical user interface for video parsing and browsing the of the storyboard. Specifically, storyboarding can be accomplished on the World Wide Web by parsing an input video into representative or key frames. These frames then can be posted to a web document, or the like, for subsequent viewing by a user. This allows a video to be distilled down to the essential frames thus eliminating storage and bandwidth problems as well as eliminating the need for a user to view the entirety of the video. Furthermore, the graphical user interface allows a user to visually interact with an input video signal to determine the key or representative frames, or to retrieve video segments associated with already determined key frames. Furthermore, the interface allows manipulation of these frames including, but not limited to, playing of the entire segment represented by that key or significant frame as well as actual determining of the cuts between significant segments.

11 Claims, 10 Drawing Sheets

OTHER PUBLICATIONS

Y. Tonomura et al., "VideoMAP and VideoSpaceIcon: Tools for Anatomizing Video Content," *INTERCHI '93*, The Netherlands, Apr. 24-29, 1993, pp. 131-136.

M. Yeung et al., "Video Browsing Using Clustering and Scene Transitions on Compressed Sequences," *SPIE*, vol. 2417, Feb. 1995, pp. 399-413.

"An Exploration of Dynamic Documents," http://home.netscape.com/assist/net_sites/pushpull.html, Sep. 25, 1998.

VISICOM, Vigra products, http://www.vigra.com, Sep. 25, 1998.

Cheetah Systems, Inc., http://www.caption.com/products/index.shtml, Sep. 25, 1998.

* cited by examiner

FRAME NUMBER

METHODS AND SYSTEMS FOR REAL-TIME STORYBOARDING WITH A WEB PAGE AND GRAPHICAL USER INTERFACE FOR AUTOMATIC VIDEO PARSING AND BROWSING

This is a divisional of U.S. Ser. No. 09/271,867, filed Mar. 18, 1999 now U.S. Pat. No. 6,647,535 by the same inventors, and claims priority therefrom. This divisional application is being filed in response to a restriction requirement in that parent application, and contains rewritten and additional claims to the restricted-out subject matter of original claims.

BACKGROUND OF THE INVENTION

This invention relates to real-time storyboarding using a graphical user interface to automatically parse a video data signal and browse within the parsed video data signal. Specifically, this invention is directed toward systems and methods that generate a real-time storyboard on a distributed network, such as the World Wide Web (WWW), and a graphical user interface tool for fast video analysis of both compressed and uncompressed video images for automatic parsing and browsing.

A "document" is no longer merely a conventional paper product. Rather, a "document" now encompasses electronic multimedia files which can include audio, video and animations, in addition to text and images. Nevertheless, people still prefer to print or have a hard copy of the multimedia document for various reasons, including portability and ease of reading. For space-dependent information, such as text and images, printing is easy.

Video is becoming an important element in many applications, such as multimedia, news broadcasting, video conferencing and education. A plethora of scholars, including political scientists, physicians and historians, study video or multimedia documents as a primary source of educational or research material. By using traditional techniques, such as video recorders, one is able to view the material of interest, or fast forward and/or rewind to sections deemed important. However, since video content is generally extremely vague, multimedia and video cannot be handled as efficiently as text. For example, most multimedia and video application systems rely on interactive user input to compile the necessary representative static data.

SUMMARY OF THE INVENTION

However, to easily scan the content of a document containing audio/video or animations, or print portions of the document containing audio/video or animations, the dynamic information must first be converted into a static counterpart. By performing a real-time dynamic-to-static conversion on the video or multimedia document, the methods and systems of this invention enable printing and/or viewing through a distributed network, such as the World Wide Web (WWW), whether or not the original source contains command information pertaining to the significant or representative frames of the document. The command information which is embedded during production specifically indicates that one or more frames is representative of a particular segment of the document.

In one example, a corporation desires to show a video to its employees that contains the chief executive officer's report of the previous quarter, questions and answers and some of the company's new products. Traditionally, this is achieved by collocating the employees in a conference room and showing them the video, or performing a multicast throughout the company. Another way to show the report would be to convert the video into a format which can be displayed as a video on an intranet or the Internet, such as in a web page, thereby allowing employees to view it at their discretion. However, this would require tremendous bandwidth and storage capabilities.

Alternatively, by processing the video or multimedia document, the systems and methods of this invention summarize the original video, i.e., the dynamic information, by placing representative static images, and if appropriate, associated text, into a web document for viewing. This overcomes the storage and bandwidth problems previously mentioned, as well as solves the problem of scanning or printing a dynamic document. Since the dynamic media is converted into static media before being presented, the static media can then be printed during a presentation using commonly used and known techniques.

Once a video or multimedia document has been disassembled into key frames and placed on a distributed network or into a web document, a user is able to further browse the details of each segment represented by the key frame.

This invention provides systems and methods for real-time storyboarding on a distributed network.

This invention separately provides a graphical user interface that allows both automatic parsing and browsing of video sequences from the key frames.

This invention separately provides methods and systems for automatic video parsing of a video and/or for browsing through the video using a graphical user interface.

This invention separately provides for real-time dynamic-to-static conversion of video documents.

This invention also provides systems and methods that allow for printing and/or viewing static documents through a distributed network, such as the World Wide Web, when the original source is a video or multimedia document.

This invention separately provides systems and methods that reduce the dependency on humans to create visual aids representing meaningful segments of a video or multimedia document.

This invention separately provides systems and methods that eliminate required interactive components for translating a parsed incoming video data signal into meaningful segments.

By using statistical methods based on frame and histogram differencing, key frames can be extracted. The extracted key frames associated with each segment can then be used for fast browsing or for retrieving the actual video or multimedia clip represented by that key frame. For example, a first image, e.g., captured frame, of a segment could be shown. Through a graphical user interface, the user could elect to play the remainder of the segment, or skip forward to the next significant, or key, frame.

These and other features and advantages of this invention are described in or are apparent from the following detailed description of the preferred embodiments.

DETAILED DESCRIPTION OF PREFERRED EMBODIMENTS

In the following detailed discussion of the exemplary embodiments of the systems and methods of this invention, the terms "web page" and "web document" refer to any document located on a distributed network, where the document needs to be transmitted between nodes of the distributed network in order to access the document.

Figure 1:
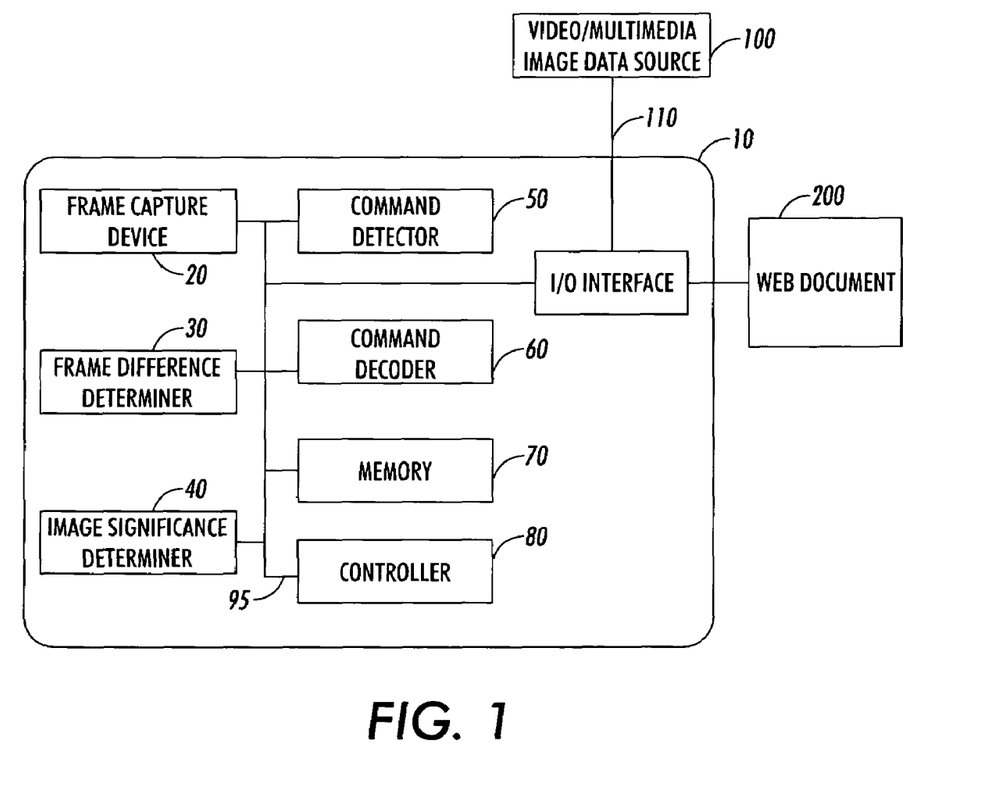
FIG. 1 is a functional block diagram of one embodiment of a system for real-time storyboarding on a distributed network.

FIG. 1 shows one exemplary embodiment of a storyboarding system 10 according to this invention. Specifically, the storyboarding system 10 includes a frame capture device 20, a frame difference determiner 30, an image significance determiner 40, a command detector 50, a command decoder 60, a memory 70, a controller 80 and an input/output interface 90, all interconnected by a data and/or control bus 95. The video/multimedia image data source 100 provides a multimedia signal to the storyboarding system 10.

It should be understood that, for the following discussion of the systems and methods according to this invention, the term "multimedia image data signal" encompasses a signal or group of signals including one or more of, or all of, a sequence of video frames, any analog and/or digital audio data, any data that may reside in one or more side bands, and any ancillary analog and/or digital data, such as closed-captioning, that are transmitted or stored together and the term "multimedia image data source" encompasses any device, system or structure capable of supplying such multimedia image data signals. These signals further include any other known video type or signal or any other known or later-developed signal that would be obvious to incorporate into the "multimedia image data."

Furthermore, it should be appreciated that the multimedia image data and multimedia image data signal may be broadcast, for example, by traditional broadcast techniques, or by cable televisions distribution services, analog and/or digital satellite systems, the Internet, an intranet, a local-area network, a wide-area network, or any other known or later-developed wired or wireless network. Additionally, it should be appreciated that the multimedia image data and multimedia image data signal can be stored on traditional media, such as videocassettes, or on a digital video disk, a mini-disk, a CD-ROM or using volatile or non-volatile memory. Furthermore, it should be appreciated that the video frames of the multimedia image data and multimedia image data signal can be recorded by a video recorder, such as a camcorder, or displayed by a display device, such as a television, personal computer, overhead projector, or the like. The multimedia image data source only needs to be capable of supplying at least one multimedia image data signal to the storyboarding system 10.

The storyboarded images generated by the storyboarding system 10 are output to a web document 200. However, it should be understood that web document 200 is not limited specifically to distribution over the Internet or an intranet. Rather, the systems and methods of this invention encompass any known or later-developed type of document and any other known or later-developed system or structure for displaying the storyboarded images that are generated according to this invention. For example, other systems or structures for displaying the web document 200 can include web documents, including web pages, in the Hyper-Text Mark-up Language (HTML), Dynamic Hyper-Text Mark-up Language (DHTML), or Virtual Reality Modeling Language (VRML), specifically-designed network displays, internet television, a graphical-user-interface-type display, or the like.

The storyboarding system 10 receives the multimedia image data signal from the video/multimedia image data source over a signal link 110. The link 110 can be any known or later-developed device or system for connecting the video/multimedia image data source 100 to the storyboarding system 10, including a direct cable connection, a connection over a wide area network or a local area network, a connection over an intranet, the Internet, or a connection over any other distributed processing network or system. In general, the link 110 can be any known or later-developed connection system or structure usable to connect the video/multimedia image data source 100 to the storyboarding system 10.

The input multimedia image data signal may contain command data, e.g., closed-caption information, from which the location of significant frames can be determined. The frame capture device 20 captures each frame of the input multimedia image data signal. The command detector 50 determines if the multimedia image data signal contains any command data. The command decoder 60 then decodes any command information that may be present in the multimedia image data signal. For example, command data can be embedded in the closed-caption portion of the original multimedia image data input source to indicate significant or key images. Specifically, the closed-caption data is transmitted in a scan line 21 of the first field of each frame of the input multimedia image data input signal. However, this scan line does not appear on the screen because it is part of the vertical blanking interval. The command data is nevertheless capable of conveying information regarding the significance of at least one frame to the storyboarding system 10.

In addition to the command detector 50 and the command decoder 60, which allows determining significant images based on an already-encoded command, the frame difference determiner 30 of the storyboarding system 10 determines additional significant frames. Specifically, the frame difference determiner 30 computes the difference between two consecutive frames, for example, on a pixel-by-pixel basis. U.S. patent application Ser. No. 09/271,869 filed Mar. 18, 1999, now U.S. Pat. No. 6,493,042 issued Dec. 10, 2002, incorporated herein by reference in its entirety, discloses systems and methods that detect discontinuous cuts and that detect gradual changes from edge count and a double chromatic difference. Furthermore, Ser. No. 09/215,594, now U.S. Pat. No. 6,252,975 issued Jun. 26, 2001, entitled "A Method And System For Real Time Feature Based Motion Analysis For Key Frame Selection From a Video", incorporated herein by reference in its entirety, could also be used to select key frames. However, it should be appreciated that any known or later-developed frame difference determining system and method can be used in lieu of the various systems and methods described in the incorporated U.S. Pat.

No. 6,493,042. The frame difference determiner 30 needs only to determine a threshold difference between each consecutive frame.

Figure 2:
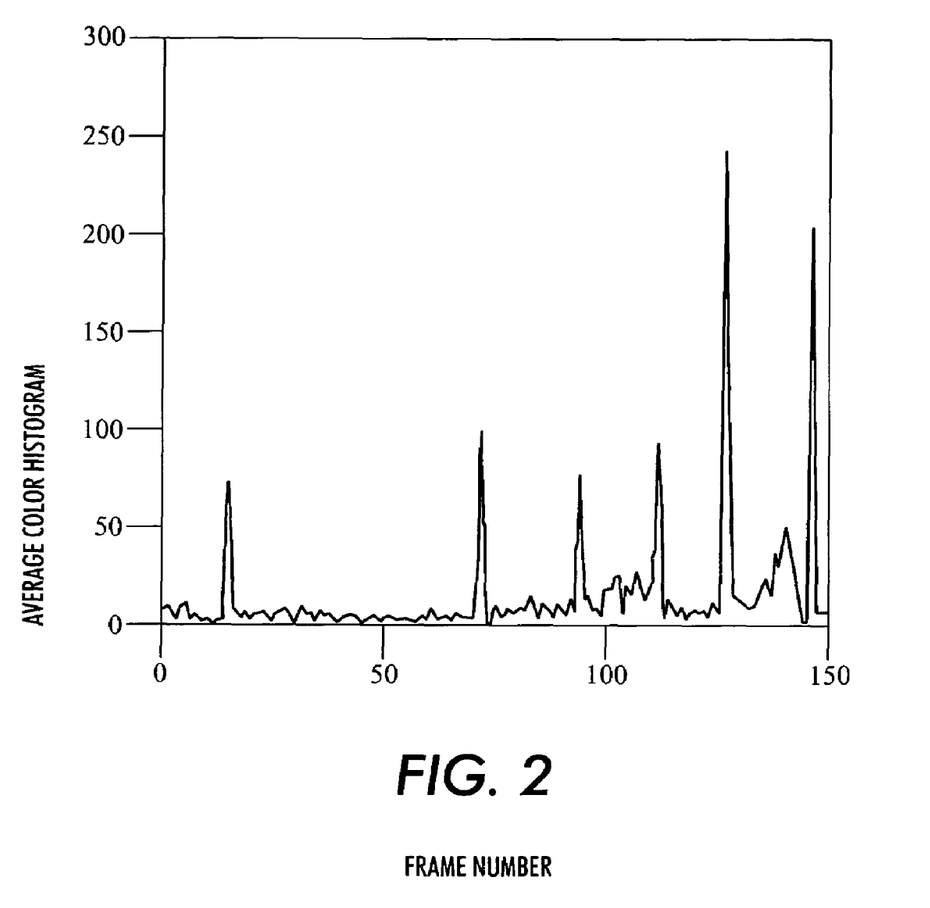
FIG. 2 is an exemplary histogram of a video segment.

For example, FIG. 2 illustrates an average color histogram of an exemplary portion of a multimedia image data signal. The segment boundaries within this portion of the multimedia image data signal are clearly visible as peaks in the histogram. Therefore, for example, a frame within a segment bounded by two peaks in the histogram could be captured and stored as a representative or significant frame for that segment. Alternatively, a frame directly corresponding to one of the peaks can be selected and stored as the representative image.

The image significance determiner 40, at the direction of the controller 80 and with the aid of the memory 70, decides whether a selected frame within a segment should be kept as a representative image for that segment. For example, a selected frame can be kept as a representative image if, for example, command data is associated with that frame, or a certain threshold, such as intensity difference, is exceeded when the selected frame is compared to another frame within the same segment or the time difference between the selected frame and the previous representative frame exceeds a certain threshold. If the selected frame is determined by the image significance determiner 40 to be representative of that segment, then that selected frame is stored in the memory 70.

Figure 3:
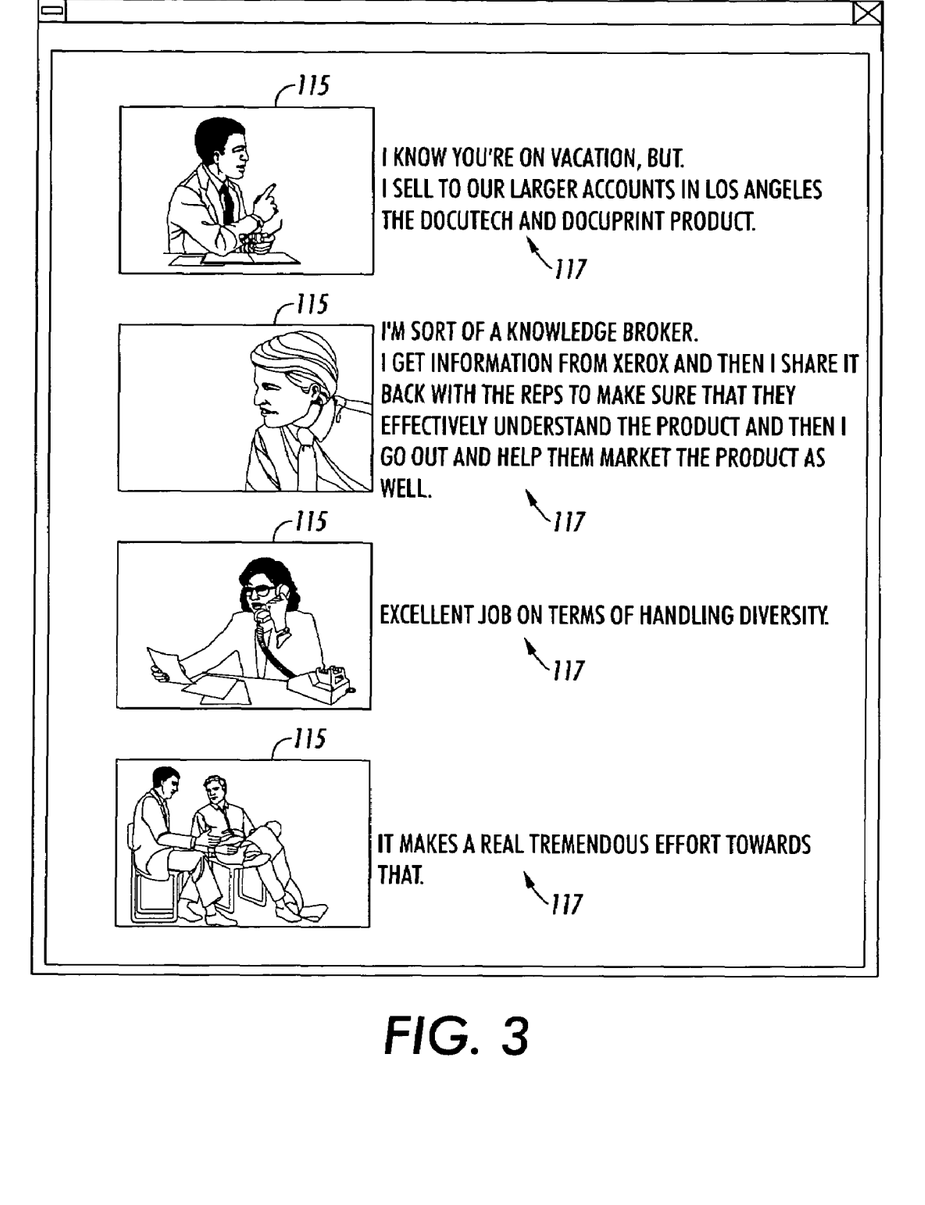
FIG. 3 is an exemplary output of the storyboarding system on a web page.

Once enough representative images are stored in the memory 70, a compilation of the representative images, such as that shown in the web document 210 of FIG. 3, can be generated. Specifically, the web document 210 shown in FIG. 3 includes a series of representative images 115, and their respective accompanying text 117. It should be appreciated, however, that the compilation of representative images need not necessarily be displayed in a web document. Alternatively, the representative images could, for example, be output to a printer or assembled into an electronic document specifically designed for displaying the representative images.

Depending on the length of the incoming multimedia image data signal, the storyboarding system 10 can continue storing representative images in the memory 70 until the entire multimedia image data signal has been processed. Alternatively, the storyboarding system 10, upon determining a predetermined number of representative images, could immediately transfer those images to, for example, a web document.

Furthermore, it should be appreciated that the storyboarding system 10 can communicate with the web document or the device for displaying the representative images. Therefore, the storyboarding system 10 can cooperate, for example, with the web document to control the number of representative images transferred to that web document. Alternatively, the storyboarding system 10 could direct the display data or request the generation of a new web document once a threshold number of representative images has been transferred to that web document. Using this method, the storyboarding system 10 performs the same steps for assembling consecutive representative frames or representative frame documents until the incoming multimedia image data signal has been completely processed.

As previously mentioned, the storyboarding system 10 can determine representative images based on the change in intensity between consecutive frames, in addition to detecting commands which may be present in the received multimedia image data signal.

For example, an incoming multimedia image data signal may have embedded command information indicating which frames are significant. The storyboarding system 10, could, for example, automatically capture all frames identified by the command information and store the captured frames in the memory 70. However, this level of segmentation may not provide enough information to the user regarding the content of the input video/multimedia presentation represented by the multimedia image data signal. Therefore, the storyboarding system 10 can further detect representative images, for example, between representative images identified by the command data, based on the following comparison of the change in intensity between consecutive frames of the incoming multimedia image data signal.

The change in intensity $E(t_i)$ for a current frame occurring at time $t=t_i$, relative to a next frame, is:

$$E(t_i) = \sum_{(x,y)} |I(x, y, t_i) - I(x, y, t_{i+1})|, \quad (1)$$

where:
x and y are the spatial locations within a frame;
$t_i$ identifies the current frame;
$t_{i+1}$ identifies the next frame;
$I(x,y,t_i)$ is the intensity of the pixel at the spatial location (x,y) in the $i^{th}$ frame; and
the summation is over all the pixels within the current frame.

If the change in intensity between two consecutive frames is greater than a predefined threshold, the intensity content of the two consecutive frames is different enough to be an indication that the current frame is representative. For example, the change in intensity between frames 74 and 75 as indicated in the histogram shown in FIG. 2 exceeds such a threshold. Accordingly, the frame 75 is identified as a representative image. Therefore, the storyboarding system 10 stores this identified frame 75 as the next representative image in the memory 70.

It should also be appreciated that when there is no command information in the input multimedia image data signal, such as in most multimedia image data signals, this intensity comparison technique can be used alone to find the representative images of the incoming multimedia image data signal.

In this instance, the representative images are determined using Eq. 1 and then stored in memory 70. The representative images can then be output to a web document or to similar document to form a compilation of the stored representation images.

Figure 4:
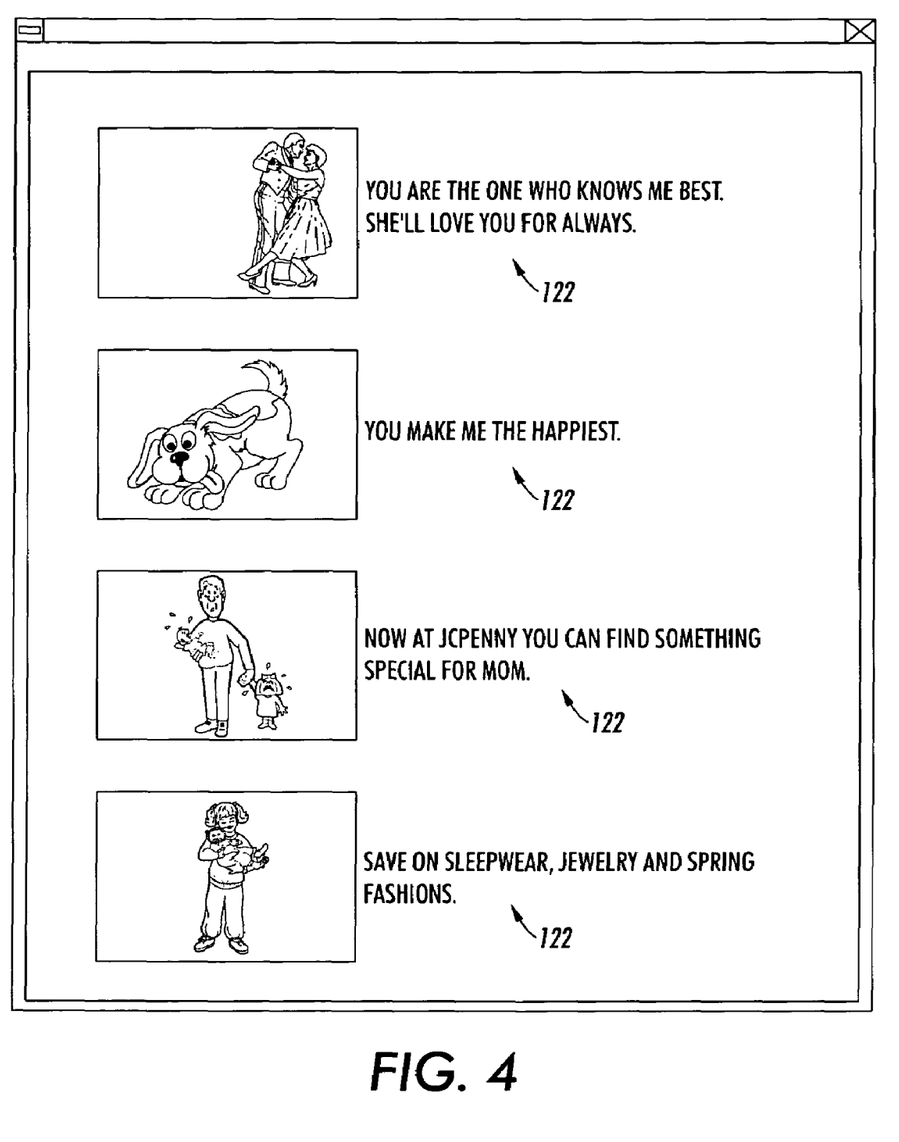
FIG. 4 is an exemplary storyboard according to this invention.

However, command information, such as closed-caption information containing special characters, or text strings, can be embedded in a portion of the multimedia image data signal to indicate, or supplement, a representative or significant image. For example, FIG. 4 illustrates the representative frames and text strings 122 that were derived from an exemplary multimedia image data signal containing command information.

For example, special characters in the command data can indicate representative images, change in speakers, or additional data to be displayed, for example, with the representative image.

With closed-caption data, a change in the speaker can be represented, for example, by the special character string ">>" during production. Thus, for the exemplary commercial segment shown in FIG. 4, this character string acts as the command indicating, for each occurrence, that a new frame and text string 122 are to be captured.

Figure 5:
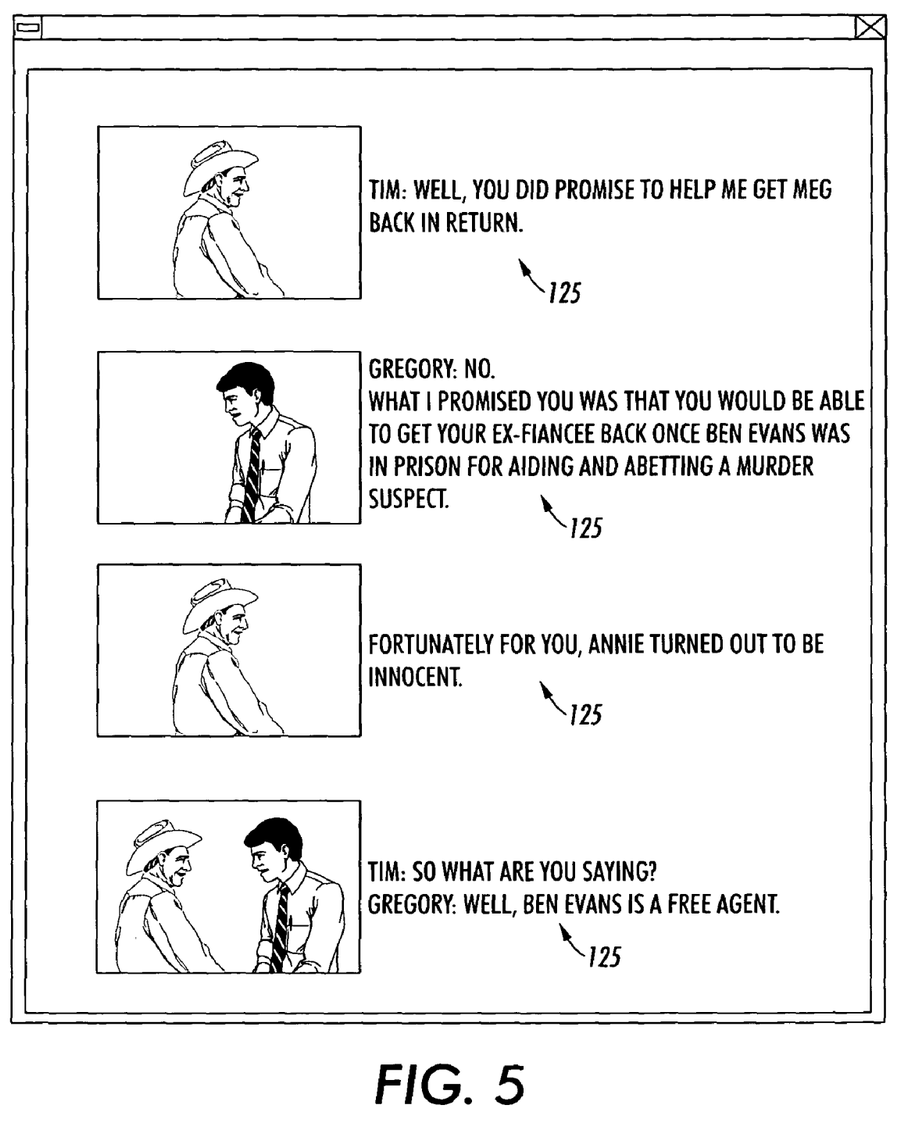
FIG. 5 is another exemplary storyboard according to this invention.

Furthermore, the above character string, or some other character string, can indicate that additional information is to be displayed with the representative image. FIG. 4 also illustrates exemplary textual blocks of information 122 that were associated during production and displayed with the exemplary incoming video data signal. However, as shown in FIG. 5, sometimes a speaker may change after a single person says a couple of words or a single speaker continues to talk for a long period of time. In these cases, more than a single representative frame of a single segment, in addition to any supplemental information, such as text, that should be displayed with the representative frame, may need to be captured with textual blocks of information 125 in order to have the representative images convey the significance of the video.

As shown in FIG. 5, representative images were captured each time the speaker changed. Additionally, supplemental text 125 was incorporated with the representative frame indicating the change in the speaker to supplement and more fully convey the flow of the multimedia image data input signal.

However, there may be instances when a single speaker talks for a long time. FIG. 3 shows such an instance. In this instance, it may be appropriate, as shown in FIG. 3, to capture a plurality of frames of the same speaker, i.e., the same segment, to compile a set of representation images for the input multimedia image data signal.

In addition to the ">>" character string, additional special characters or character strings can also be used to identify significant images. These additional special characters, such as "!", "?", and ";" can indicate, for example, the end of a sentence, end of a question or the beginning of a musical piece. The image significance determiner 40 additionally determines the maximum number of characters that can be associated with each image, and/or monitors the time lapse between significant images. For example, an extended time lapse between command data can trigger the image significance determiner 40 that an additional representative image may be required.

Therefore, for each determined representative image, whether based on command data, time lapse or intensity comparison, the storyboarding system 10 stores the representative image and any associated text to be displayed in the memory 70. The storyboarding system 10 can then output the representative images to, for example, the exemplary document 200. The document 200 can display a sequence of representative frames. Alternatively, the document 200 could be configured to display a certain number of frames and then refresh, or update, the representative images once a threshold number of frames is displayed. Therefore, the representative images would cycle through the web document as new representative images are encountered. Furthermore, the representative images can be streamed, i.e., updated and published, for example, to a document, in real-time or near real-time, as the incoming multimedia image data signal progresses.

Figure 6:
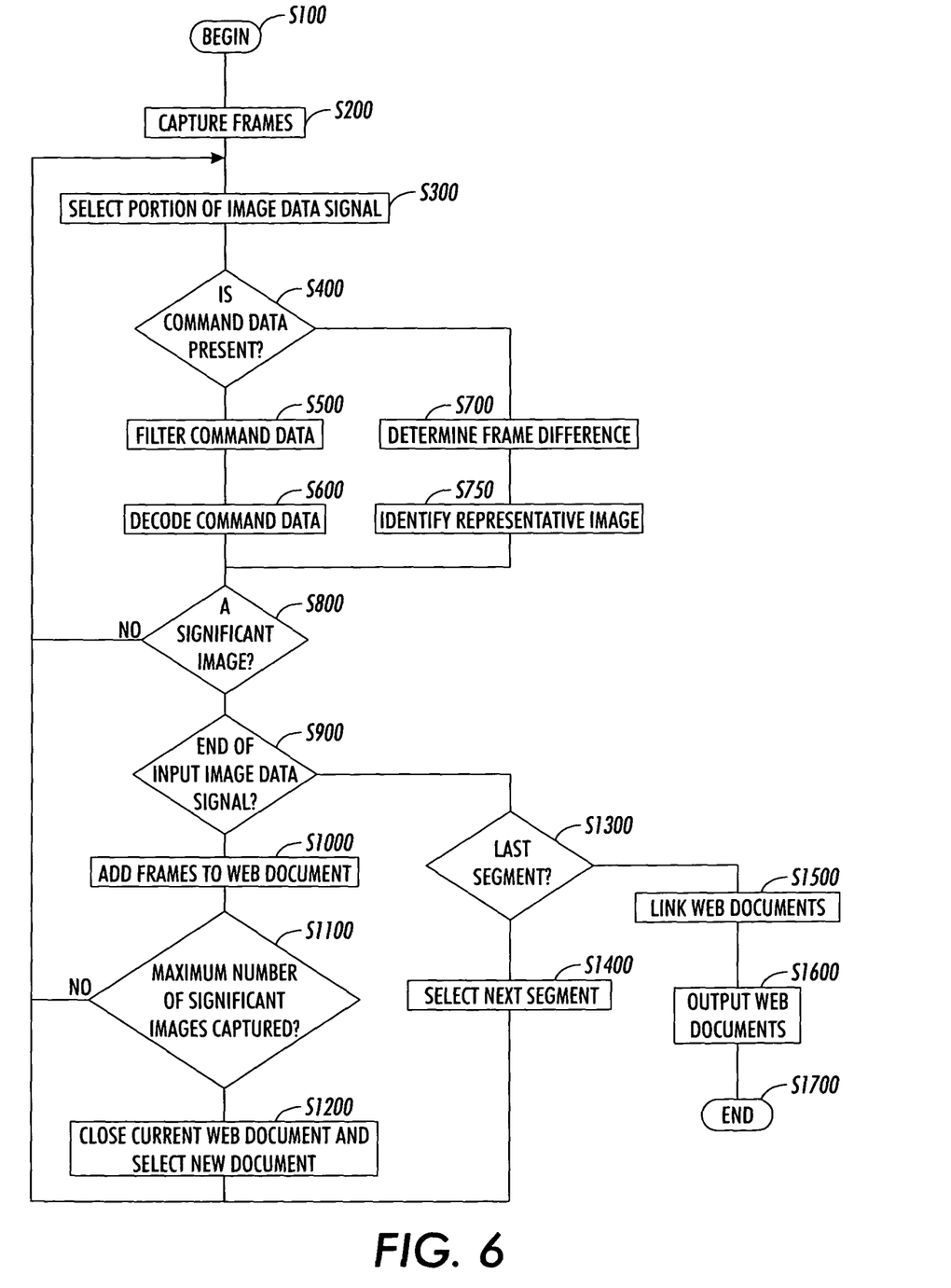
FIG. 6 is a flowchart outlining one exemplary embodiment of a method for outputting significant frames to storyboard a video.

FIG. 6 outlines one exemplary embodiment of a method for determining significant images for storyboarding according to this invention. Assuming the multimedia image data signal may or may not have been encoded with one or more command signals, determining significant images is straightforward. Upon receiving the multimedia image data signal that may contain one or more embedded command signals, any command signals are detected and a frame difference comparison is performed to isolate additional significant images between the already indicated representative images.

Control begins in step S100. Control then continues to step S200, where the frames from the multimedia image data source are captured. Then, in step S300, at least a portion of the input multimedia image data signal is selected. Next, in step S400, a determination is made whether command data is present in the selected portion video signal. If command data is present, control continues to step S500. Otherwise, control jumps to step S700.

In step S500, the captured frames are filtered to isolate command data. Then, in step S600, the command data is decoded to identify zero, one or more representative images. Control then jumps to step 800.

In contrast, in step S700, the frame differences between adjacent frames are determined. Specifically, the frame difference can be determined in accordance with U.S. Pat. No. 6,493,042 issued Dec. 10, 2002. However, it should be appreciated that one of ordinary skill in the art could modify this method, or use any other method that allows one or more representative frames to be identified. Then, in step S750, one or more representative frames are identified based on the frame difference. Control then passes to step S800.

In step S800, a determination is made whether the representative image are significant. If the image is significant, control passes to step S900. However, if the one or more representative images are determined not to be significant, control returns to step S300.

In step S900, a determination is made as to whether the end of the input video signal has been reached. If the end of the input video signal has not been reached, control continues to step S1000. However, if the end of the input video signal has been reached, control jumps to step S1300.

In step S1000, the one or more representative frames are added to a current web document. Then, in step S1100, a determination is made whether a maximum number of significant images have been captured for a single web document. If the maximum number of images for a web document has been reached, control continues to step S1200. Otherwise, control jumps back to step S300.

In step S1200, the current web document is closed and a new web document is selected as the current web document. Control then returns to step S300.

In step S1300, a determination is made whether the selected segment is the last segment of the input multimedia data signal. If so, control jumps to step S1500, Otherwise, control continues to step S1400, where a next segment is selected. Control then jumps back to step S300.

In contrast, in step S1500, the current web document and any filled web document are linked together. Then, in step S1600, the set of linked web documents are output as the static representation of the input multimedia image data signal. Control then continues to step S1700 where the control sequence ends.

Figure 7A:
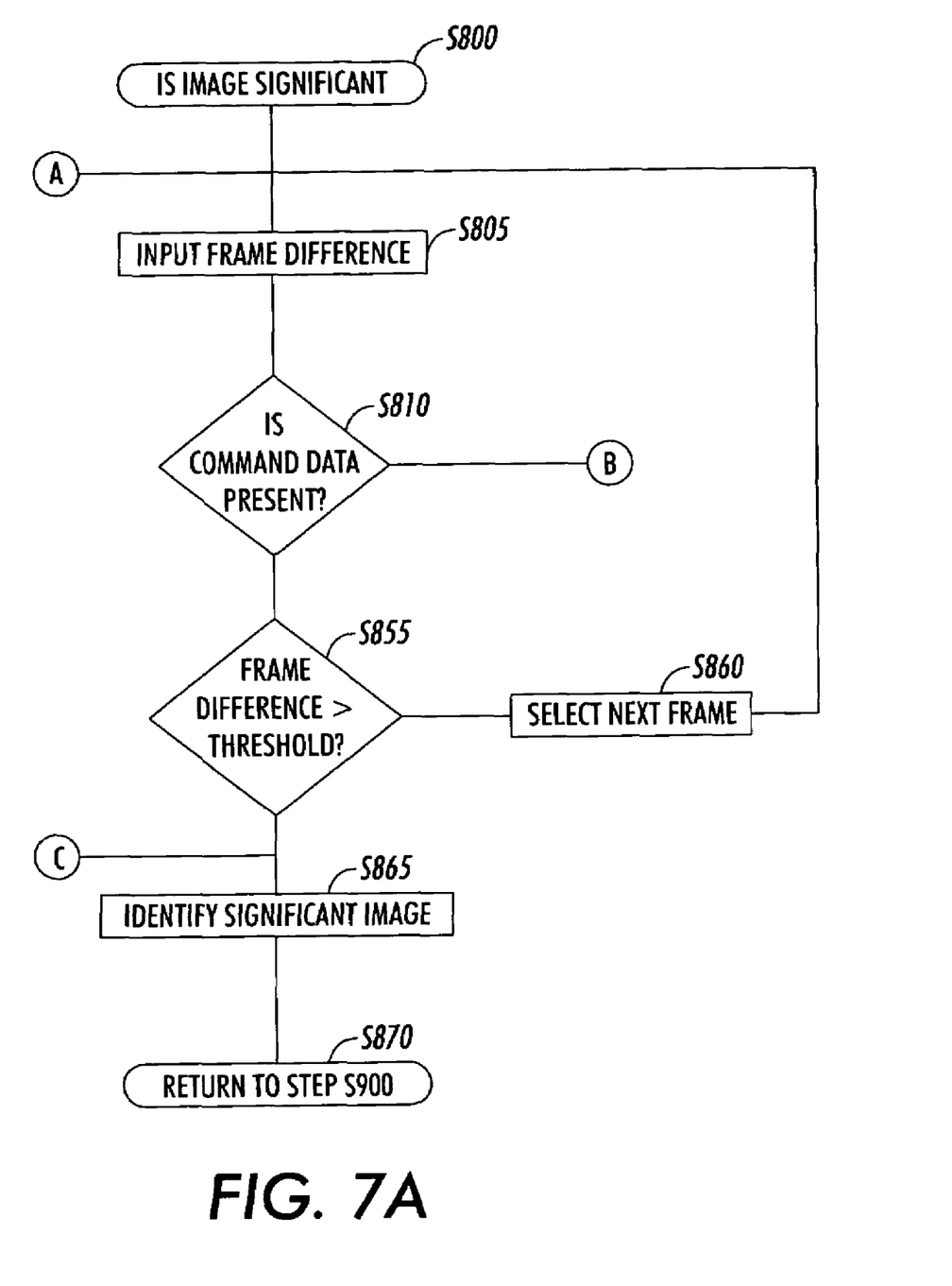
FIGS. 7A and 7B are a flowchart outlining in greater detail one exemplary embodiment of the significant image determining step of FIG. 6.
Figure 7B:
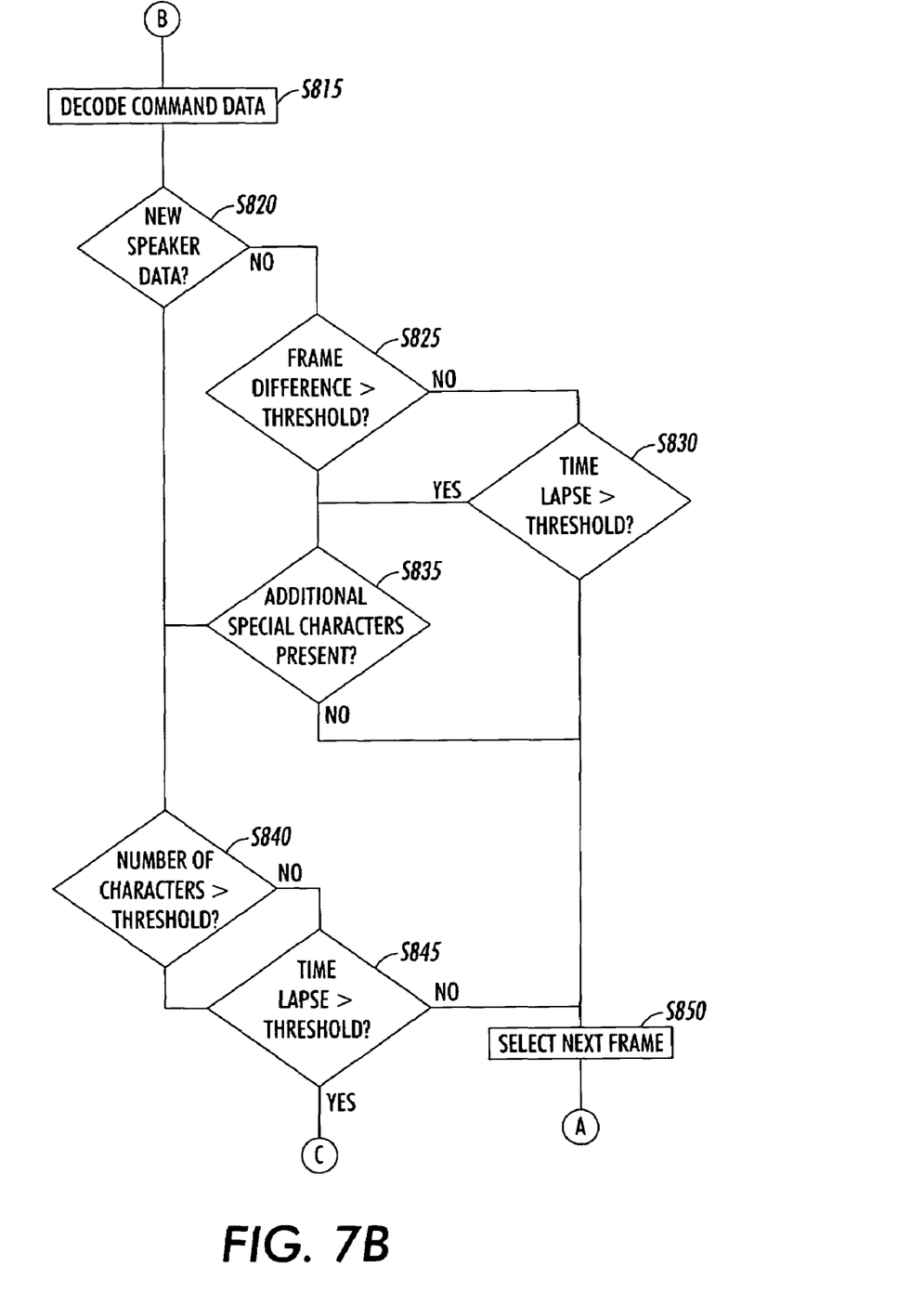

FIGS. 7A and 7B illustrate in greater detail one exemplary embodiment of the significant image determination step S800 of FIG. 6. Control begins in step S800. In step S805, the determined frame difference; if any, is input. Next, in step S810, a determination is made whether command data is present. If command data is not present, control jumps to step S855. Otherwise, control continues to step S815.

In step S815, the command data is decoded. Then, in step S820, a determination is made whether new speaker data is present. If new speaker data is present, control jumps to step S840. Otherwise, control continues to step S825.

In step S825, a determination is made whether the frame difference is greater than a threshold. If the frame difference is greater than a threshold, control jumps to step S835. Otherwise, control to step S830.

In step S830, a determination is made whether the time lapse is greater than a threshold. If the time lapse is greater than the threshold, control jumps to step S850. Otherwise, control continues to step S835.

In step S835, a determination is made whether special characters in the command data are present. If additional special characters are present, control continues to step S840. Otherwise, control jumps to step S850.

In step S840, a determination is made whether the number of command characters is greater than a threshold. If the number of command characters is greater than a threshold, control jumps to step S865. Otherwise, control continues to step S845.

In step S845, a determination is made whether the time lapse is greater than a threshold. If the time lapse is greater than the threshold, control to step S865. Otherwise, control continues to step S850. In step S850, the next frame is selected and control continues back to step S805.

In step S855, a determination is made whether the frame difference is greater than a threshold. If the frame difference is not greater than a threshold, control continues to step S860. Otherwise, control jumps to step S865. In step. S860, the next frame is selected and control continues back to step S805.

In step S865, the frame is identified as a significant image. Control then continues to step S870, where control returns to step S900.

However, it should be appreciated that while determining a representative frame based on a time lapse has been described in terms of making the determination as the input multimedia image data signal is parsed, the determination could also be made of the entire input multimedia image data signal. For example, the entire video segment could be time-lapse analyzed prior to the frame difference or command data detection procedures. Then, a second step of comparing the detected time-lapse detected representative images to the frame difference or command data detected representative images would occur. A comparison could then be done to eliminate unnecessary or redundant representative frames, e.g., a time-lapse detected frame immediately prior to a command data identified representative frame.

As shown in FIG. 1, the systems for storyboarding an input video signal according to this invention can be implemented on a programmed general purpose computer. However, the system for the storyboarding can also be implemented on a special purpose computer, a programmed microprocessor or microcontroller and peripheral integrated circuit elements an ASIC or other integrated circuit, a digital signal processor, a hard wired electronic or logic circuit such as a discrete element circuit, a programmable logic device such as a PLD, PLA, FPGA or PAL, or the like. In general, any device, which is capable of implementing a finite state machine that is in turn capable of implementing the flow charts shown in FIGS. 6-7B can be used to implement the system for storyboarding.

Recordings of moving pictures can be displayed in a variety of different formats to illustrate the information they contain. The historical and most absorbing way is to display images through the rapid succession of full screen frames. However, in order for the user to grasp the idea of the entire video, the user should see the entire collection of frames. The automatic video parsing and browsing graphical user interface of this invention allows a user to obtain necessary information about the video by viewing a selected number of automatically extracted key or significant frames instead of watching the entire video. However, if more in-depth information is desired, the user can select a key or representative image corresponding to the video segment, and view the entirety of the video or multimedia segment. Furthermore, since video or multimedia image data can be stored in a variety of formats, the systems and methods of this invention process both compressed and uncompressed video sequences.

Figure 8:
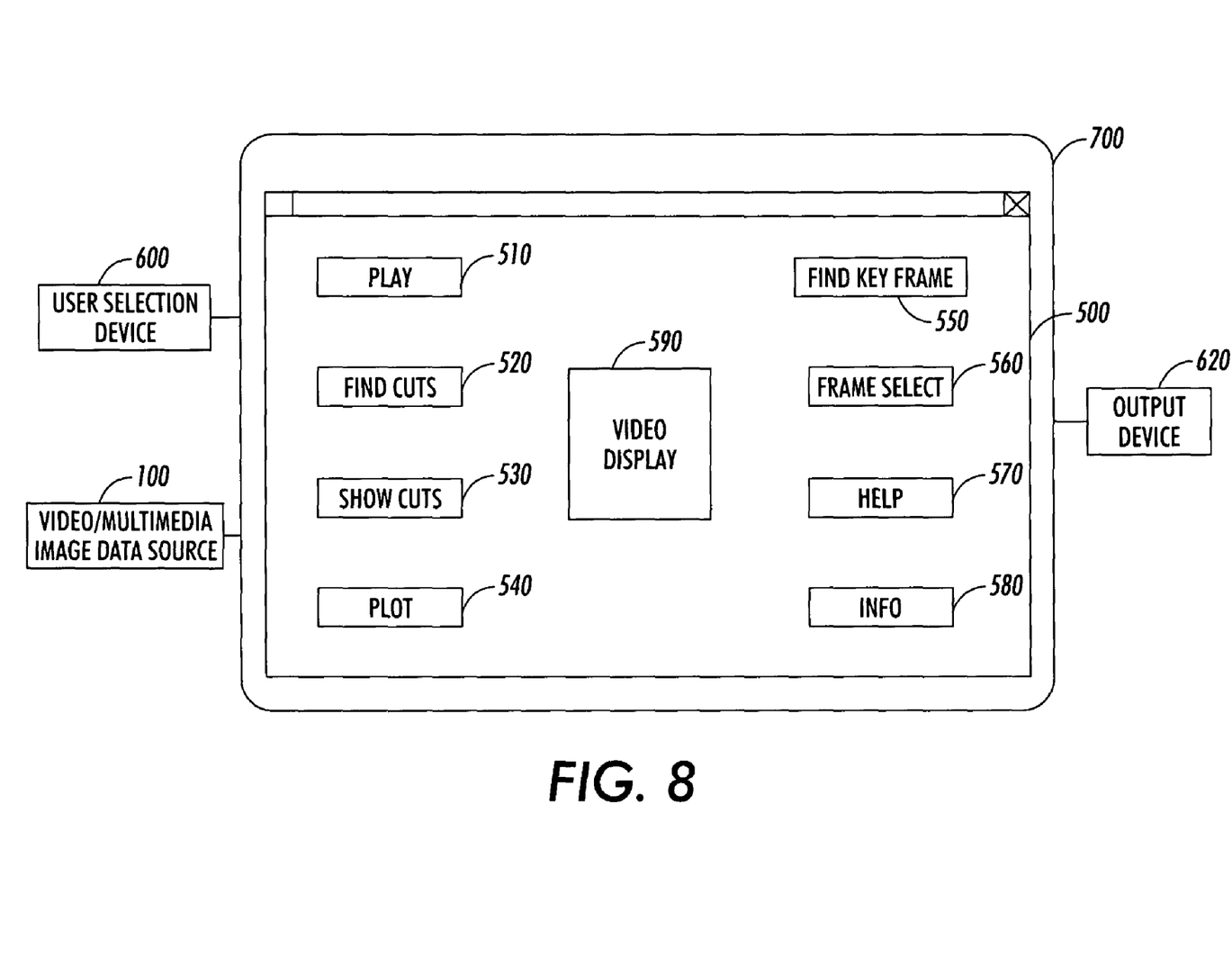
FIG. 8 is a functional block diagram of one exemplary embodiment of a graphical user interface for manipulating video segments according to this invention.

FIG. 8 shows one exemplary embodiment of an automatic video parsing and browsing graphical user interface 500 according to this invention. The automatic video parsing and browsing graphical user interface 500 can be used at least to interface with previously stored or displayed representative images. This automatic video parsing and browsing graphical user interface 500 enables fast browsing of the full video or video segment represented by the significant images. For example, the automatic video parsing and browsing graphical user interface 500 can interact with web documents that were created in accordance with the above described storyboarding systems and methods of this invention. Alternatively, the automatic video parsing and browsing graphical user interface 500 can be used to visually segment input multimedia image data to generate the representative or significant images.

This exemplary embodiment of the automatic video parsing and browsing graphical user interface 500 resides on a general purpose graphical user interface 700 which runs on a general purpose computer, such as, for example, a personal computer. The automatic video parsing and browsing graphical user interface 500 comprises a "play" widget 510, a "find cuts" widget 520, a "show cuts" widget 530, a "plot" widget 540, a "find key frame" widget 550, a "frame select" widget 560, a "help" widget 570, and an "info" widget 580, all of which are selectable by a user, for example, using any known or later-developed selection device 600. The automatic video parsing and browsing graphical user interface 500 also comprises a display section 590 for displaying at least one of a determined or input representative or significant image, a video clip, or an entire input multimedia image data signal.

The "play" widget 510 plays a multimedia image data signal. The "find cuts" widget 520 finds cuts in a multimedia image data signal. The "show cuts" widget 530 shows, for example using icons, the cuts found using the "find cuts" widget 520. The "plot" widget 540 graphically illustrates statistics relating to the multimedia image data signal. The "find key frame" widget 550 locates a key frame within a portion, such as a segment, of the multimedia data signal. The "frame select" widget 560 selects a frame in preparation for a subsequent action. The "help" widget 570 causes help information to be displayed. The "info" widget 580 causes any supplied information relating to the automatic video parsing and browsing graphical user interface or to one or more multimedia image data signals to be displayed.

The user selection device 600 allows the user to interact with the automatic video parsing and browsing graphical user interface 500. The multimedia image data source 100 provides a multimedia image data signal, representative images, a web document or a video segment to the automatic video parsing and browsing graphical user interface 500. As previously discussed, the video and/or multimedia input source 100 can be a camera or any other multimedia image date device that is capable of providing a multimedia image data signal to the automatic video parsing and browsing graphical user interface 500. The automatic video parsing and browsing graphical user interface 500 interacts with at least one input frame, segment or video clip, allowing a user to further interact with the full version of the video, for example to detect representative images, or to view already-determined representative images.

The first step in utilizing a video browsing tool or interface, which distills video content information, is to parse the multimedia image data signal into meaningful segments. To achieve this task, as previously discussed, the systems and methods of this invention determine representative frames of an input multimedia image data signal. Alternatively, the automatic video parsing and browsing graphical user interface 500, using the above described method, can parse the multimedia image data signal into meaningful segments. For example, the systems and methods of this invention can parse the multimedia image data signal using, however is not limited to, peak histogram detection, frame intensity detection, color histogram techniques as well as command data to segment an incoming multimedia image data signal into representative frames. The peaks in the histogram shown in FIG. 2 correspond to the video segment boundaries where a video segment represents a continuous action in time and space.

By detecting the segment boundaries, as previously discussed, the systems and methods of this invention can output at least one representative frame associated with each segment. Thus, the content of the multimedia image data signal can be browsed down to the key or significant frame level without necessarily viewing the entire multimedia image data signal. However, the systems and methods of this invention are not limited to browsing at the key frame level. The systems and methods of this invention also enable the user to play segments between each key or significant frame to obtain more detailed information about the entire multimedia image data signal.

Figure 9:
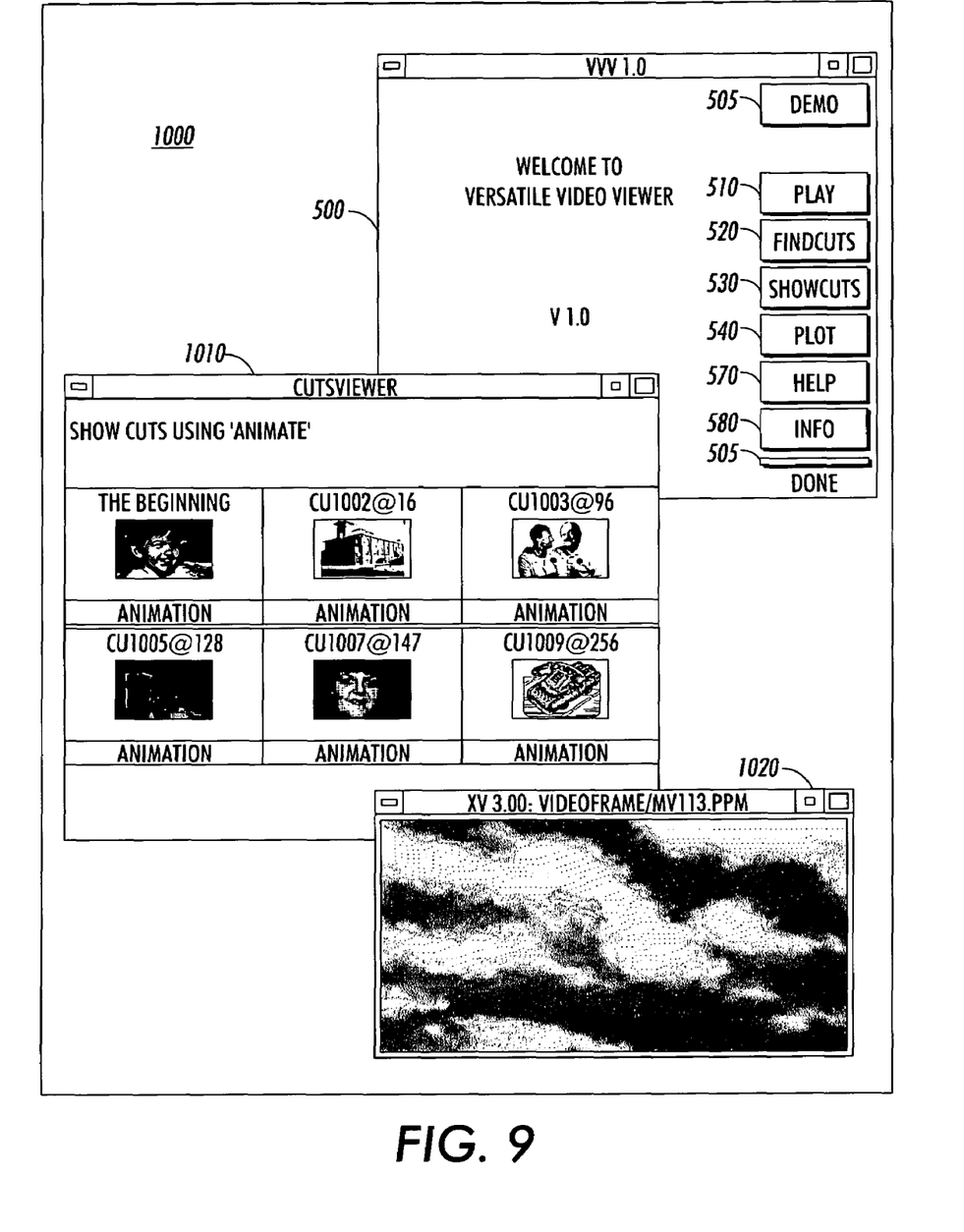
FIG. 9 is an screen capture of an exemplary graphical user interface according to this invention.

FIG. 9 illustrates one exemplary embodiment of the graphical user interface 1000 according to this invention. Specifically, the interface 1000 includes the main graphical user interface 500 from which the basic functions can be selected. A second window 1010 could show, for example, representative, significant or key images, or icons representing key images, i.e., frames. Additionally, the graphical user interface 1000 can include a window 1020 for displaying or playing a video segment or the entirety of the video.

For example, a user accesses an assembled web document containing representative images corresponding to multimedia image data that has been determined in accordance with the storyboarding systems and methods described above. After viewing the representative images, the user may desire addition information about one particular topic discussed in a video/multimedia presentation. If the user selects one of the representative frames 1012 displayed on the second window 1010 , and then selects the play widget 510, the automatic video parsing and browsing graphical user interface system 500 locates and plays the segment represented by the selected one of the representative frames 1012. Locating the segment can involve, for example, making a request to a remote server to download the corresponding signal, or could involve an interface with, for example, a video player/recorder to play the appropriate segment.

Alternatively, if a user selects the find cuts widget 520, the automatic video parsing and browsing graphical user interface system 500 segments, using the above-described systems and methods, an input video/multimedia signal, for example, a JMOVIE, PPM, MPEG, AVI, QUICKTIME, SHOCKWAVE, animated GIF, VRML or REALVIDEO clip, into key segments and/or representative frames. If the user then selects the show cuts widget 530, the representative frames 1012 can be displayed, for example, as icons 1012, as shown in FIG. 9. Then, for example, if one of the representative frame icons is selected, the corresponding full-resolution image can be displayed in the window 1020. This window 1020 can also contain standard embedded icons, for example, "PLAY," and "STOP", that would allow a user to directly manipulate the video/multimedia segment represented by the selected representative image 1012.

Additionally, the graphical user interface system 500 can include the plot widget 540, which can plot, for example, the average color histogram against frame number, as shown in FIG. 2. Alternatively, the plot widget 540 can display where the representative frames are temporally located in the video/multimedia signal. Furthermore, the plot widget 540 could, for example, plot the statistics used to determine the representative or key frames. Additionally, the plot widget 540 could allow, for example, a user to manipulate the thresholds or properties used to determine the representative images.

The automatic video parsing and browsing graphical user interface 500 can also include standard widgets, such as the help widget 570 that can, for example, provide instructions on the use of the graphical user interface, or the function of each button, the information widget 580 that can, for example, provide information, such as number of representative images in a video signal, length of a requested segment, or general information about the interface, and a done widget 505 that indicates the user is finished.

The automatic video parsing and browsing graphical user interface 500 can be implemented on a programmed general purpose computer. However, the automatic video parsing and browsing graphical user interface can also be implemented on a special purpose computer, a programmed microprocessor or microcontroller and peripheral integrated circuit elements and ASIC or other integrated circuit, a digital signal processor, a hard wired electronic or logic circuit such as a discrete element circuit, a programmable logic device such as a PLD, PLA, FPGA or PAL, or the like. In general, any device, which is capable of implementing a finite state machine that is in turn capable of implementing the automatic video parsing and browsing graphical user interface, can be used to implement the automatic video parsing and browsing graphical user interface.

Moreover, the graphical user interface system 500 can be implemented as software executing on a programmed general purpose computer, a special purpose computer, a microprocessor or the like. In this case, the graphical user interface system 500 can be implemented as a routine embedded in a network file interface, such as a web browser, or as a resource resident on a server, or the like. The graphical user interface system 500 can also be implemented by physically incorporating it into a software and/or hardware system, such as the hardware and software systems of a personal computer or dedicated video browsing system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A multimedia image data signal browsing and parsing graphical user interface comprising:
- a key frame video display area displaying at least one representative frame identified by a find key frame widget from an input multimedia image data signal based on analysis of command data within the multimedia image data signal and based on whether time difference between selected representative frame and previous representative frame exceeds a predetermined threshold, wherein the command data includes closed-caption information;
- a cuts video display area displaying cuts located by a find cuts widget in the input multimedia image data signal;
- a plot video display area displaying plots generated by a plots widget and graphically illustrating statistics relating to the input multimedia image data signal; and
- a play video display area displaying a portion of the input multimedia image data signal played by a play widget, wherein the analysis of command data includes determining whether number of characters of the command data between representative frames exceeds a predetermined maximum.

2. The user interface of claim 1 wherein the cuts video display area displays at least one discontinuous cut identified by the find cuts widget.

3. The user interface of claim 1 wherein the plot video display area displays plots resulting from parsing of the input multimedia image data signal, as well as determination of statistics relating to the input multimedia image data signal, by the plots widget.

4. The user interface of claim 1 wherein the key frame video display area displays at least one representative frame between at least two discontinuous cuts of the input multimedia image data signal having been identified by the find key frame widget.

5. The user interface of claim 4 wherein the at least one representative frame is identified based on a frame difference determination.

6. The user interface of claim 1 wherein the key frame video display area displays at least one representative frame between an end of the input multimedia image data signal and the least one discontinuous cut of the input multimedia image data signal having been identified by the find key frame widget.

7. The user interface of claim 1 further comprising a frame select widget that can select a frame of the input multimedia image data signal.

8. The user interface of claim 7 further comprising a print command interface element that, when invoked, causes the frame to be printed.

9. The user interface of claim 1 further comprising a help command interface element that, when invoked, causes help information to be displayed.

10. The user interface of claim 1 further comprising an info command interface element that, when invoked, causes information to be displayed.

11. A method comprising:
- identifying at least one representative frame of an input multimedia data image based on analysis of command data within the multimedia data image and based on whether time difference between selected representative frame and previous representative frame exceeds a predetermined threshold, wherein the command data includes closed-caption information;
- providing a video display area;
- displaying the at least one representative frame in the video display area;
- identifying at least one cut in the input multimedia data image;
- displaying the at least one cut in the video display area;
- identifying at least one cut in the input multimedia data image; and
- displaying the at least one cut in a cut display area, wherein the analysis of command data includes determining whether number of characters of the command data between representative frames exceeds a predetermined maximum.

* * * * *